(12) United States Patent
Ohta et al.

(10) Patent No.: US 7,631,416 B2
(45) Date of Patent: Dec. 15, 2009

(54) METHOD OF MAKING THIN FILM MAGNETIC HEAD USING ELECTRIC LAPPING GUIDE

(75) Inventors: Naoki Ohta, Tokyo (JP); Kazuki Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 450 days.

(21) Appl. No.: 11/798,427

(22) Filed: May 14, 2007

(65) Prior Publication Data

US 2008/0282532 A1 Nov. 20, 2008

(51) Int. Cl.
  *G11B 5/127* (2006.01)
  *H04R 31/00* (2006.01)
(52) U.S. Cl. .............. 29/603.12; 29/603.01; 29/603.13; 29/603.15; 29/603.16; 360/315; 451/5; 451/41
(58) Field of Classification Search . 29/603.01–603.18; 451/5, 41; 360/119.01–119.09, 313–327
See application file for complete search history.

(56) References Cited

U.S. PATENT DOCUMENTS

| | | | | |
|---|---|---|---|---|
| 5,483,735 A | * | 1/1996 | Postma et al. ............ | 29/603.16 |
| 6,076,252 A | * | 6/2000 | Sasaki | |
| 6,278,582 B1 | * | 8/2001 | Okawa et al. ............ | 360/235.2 |
| 6,885,528 B2 | * | 4/2005 | Hasegawa et al. ....... | 360/324.12 |
| 7,384,327 B2 | * | 6/2008 | Mizoguchi et al. ............. | 451/8 |
| 2004/0174632 A1 | * | 9/2004 | Sasaki et al. ................ | 360/122 |

FOREIGN PATENT DOCUMENTS

| JP | A 10-133397 | * | 5/1998 |
|---|---|---|---|
| JP | A 11-185218 | * | 7/1999 |
| JP | A 2003-091804 | * | 3/2003 |
| JP | A 2006-147074 | * | 6/2006 |

* cited by examiner

*Primary Examiner*—Derris H Banks
*Assistant Examiner*—Jeffrey Carley
(74) *Attorney, Agent, or Firm*—Oliff & Berridge, PLC

(57) ABSTRACT

A reticle having a convex portion and a concave portion is used to form a convex portion and concave portion in the resist pattern for magnetic detection element and conductive layer, respectively. Then, with each resist pattern as a mask, unnecessary portions are removed to determine an initial height and to form a convex portion and concave portion in the magnetic detection element layer and in the conductive layer, respectively. Then, based on a ratio between widths of the convex portion and of the concave portion of the magnetic detection element layer, a deviation of the magnetic detection element layer is obtained, and a deviation of the conductive layer is obtained in a similar way, and based on these deviations the medium facing surface is ground with the conductive layer as a resistance sensor so that the height of the magnetic detection element layer be a desired value.

7 Claims, 16 Drawing Sheets

Fig.5
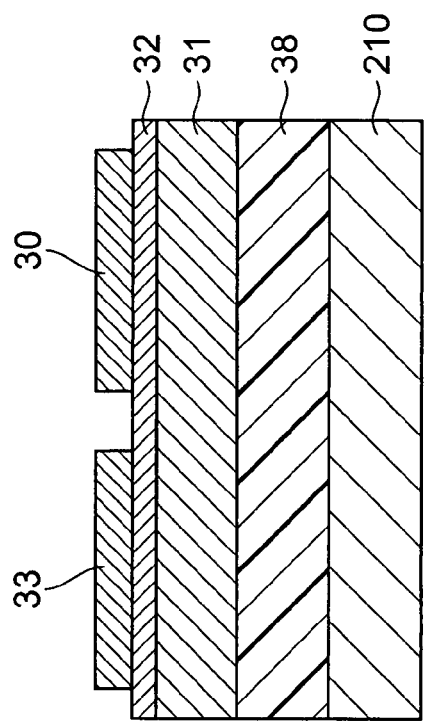
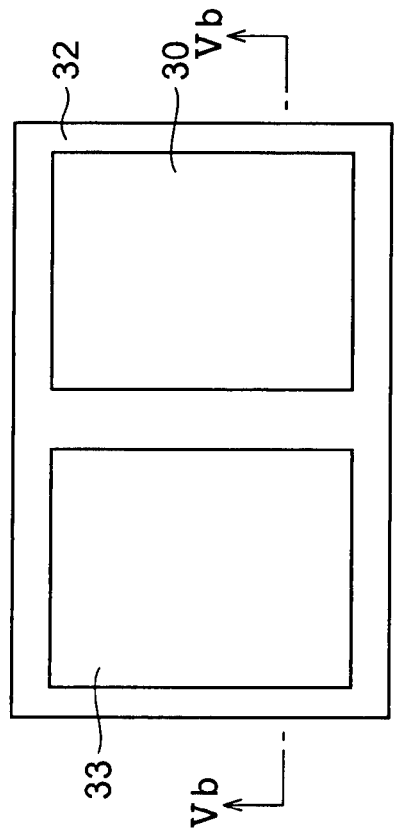

Fig.6
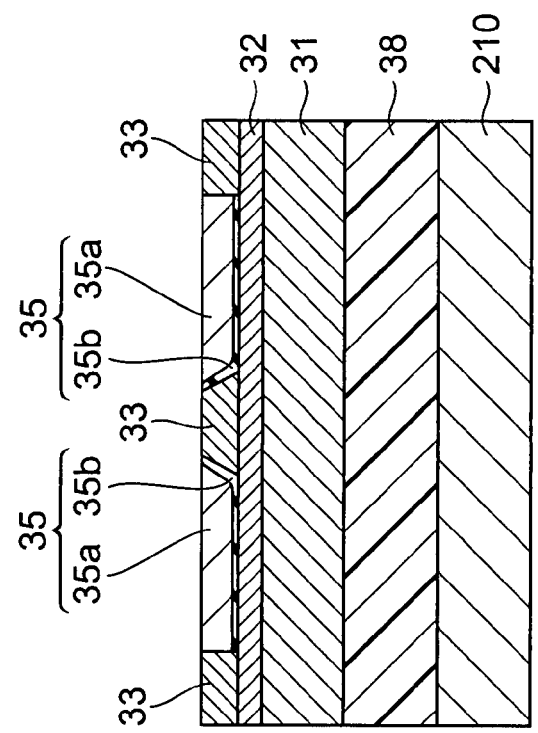
(b)
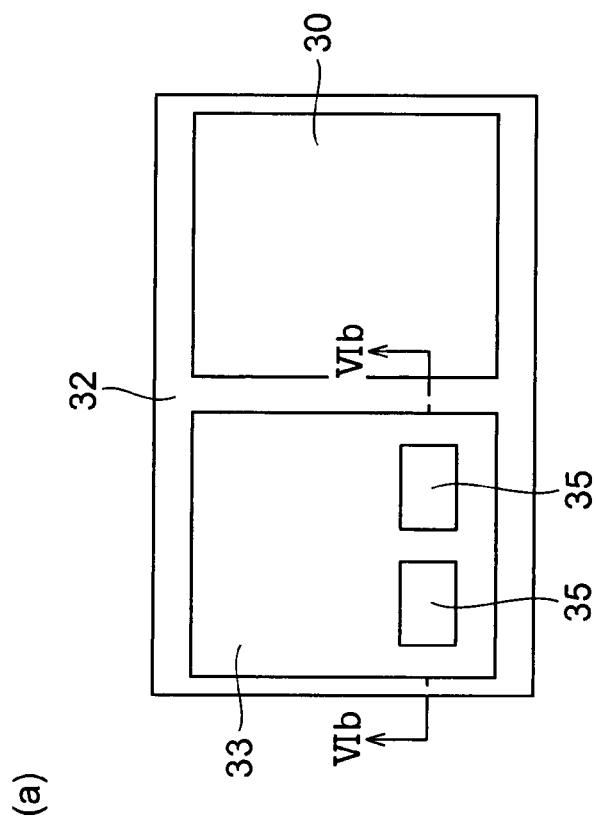
(a)

Fig.12
(a)
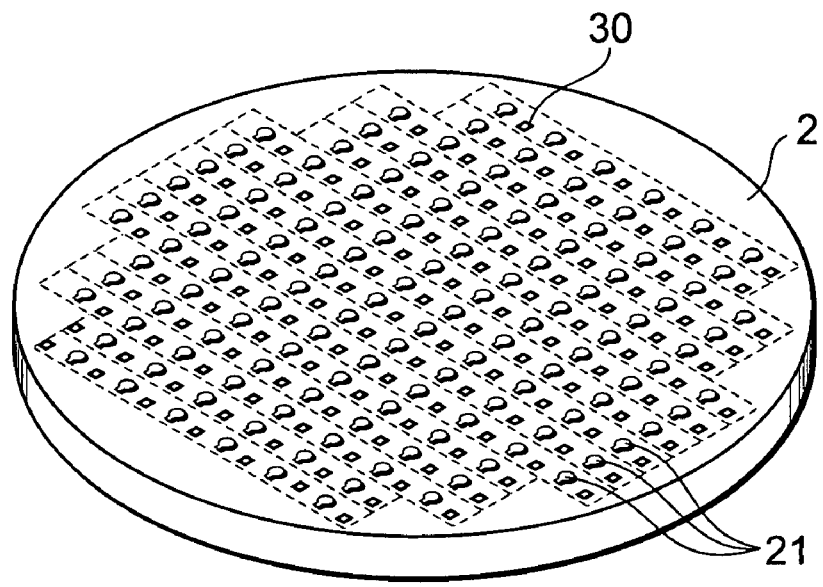
(b)
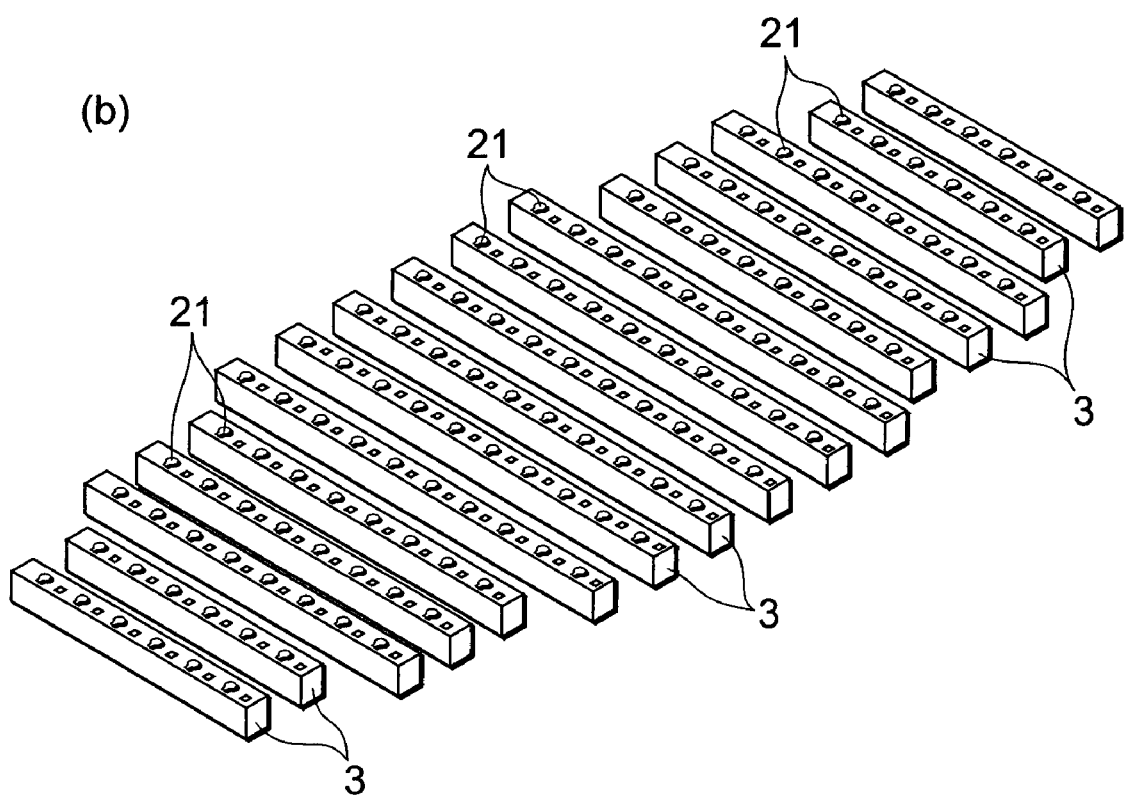

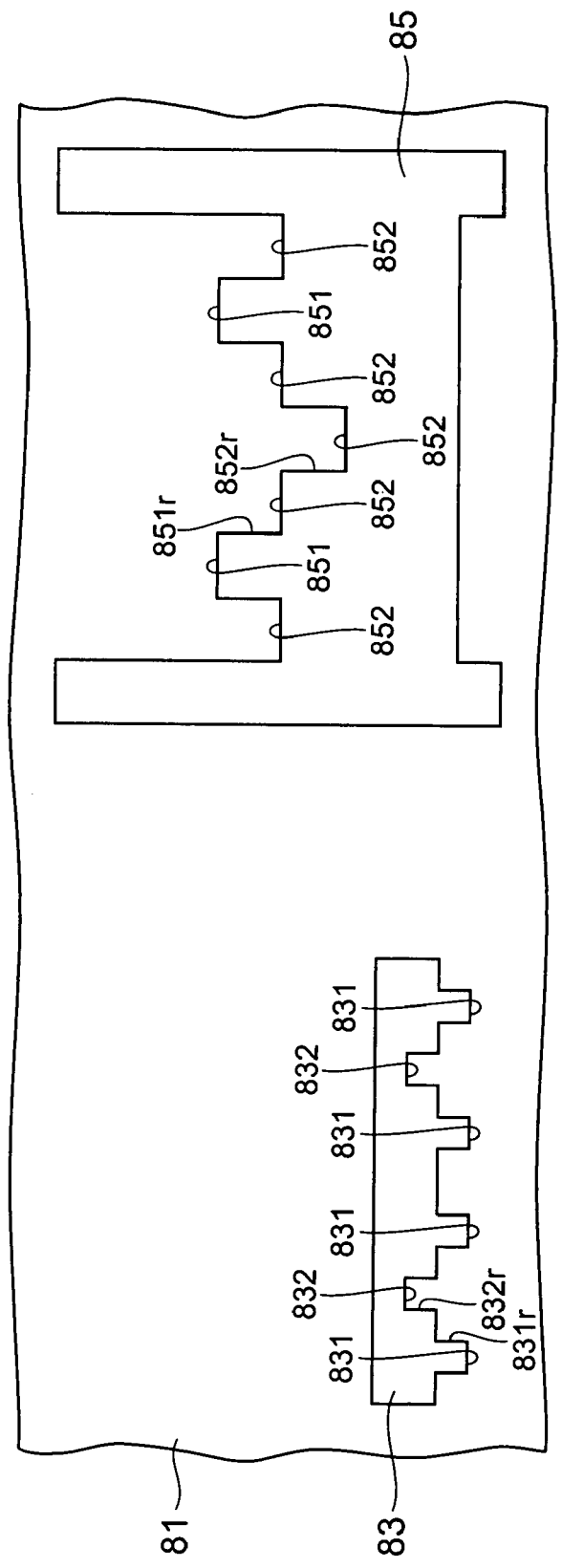

METHOD OF MAKING THIN FILM MAGNETIC HEAD USING ELECTRIC LAPPING GUIDE

BACKGROUND OF THE INVENTION

1. Field of the Invention

The present invention relates to a method of making a magnetic head.

2. Related Background of the Invention

With higher recording density of a hard disk drive unit, there is a requirement to further improve the performance of a thin film magnetic head. As the thin film magnetic head, a composite thin film magnetic head, in which a magnetic detection element such as a magneto resistance (MR) effect element and a magnetic recording element such as an electromagnetic coil element are stacked on each other, is widely used, and with these elements, detection of a data signal of a magnetic disk, which is a magnetic recording medium, and writing a data signal to the magnetic disk are carried out.

The factors governing the magnetic detection performance of the thin film magnetic head include a condition called an MR height, which is the height in the direction perpendicular to a medium facing surface of a magneto resistance effect element. This condition affects the magnitude, asymmetry, and the like of a reproduced output of the magneto resistance effect element and thus needs to be controlled precisely as designed.

The adjustment of the size of the MR height is carried out when a wafer, in which thin film magnetic heads are formed in a matrix, is cut for each row called a bar and a lapping process (grinding process) is carried out to the face in which the medium facing surface of this bar is formed. Then, in order to detect the lapping amount in carrying out the lapping process, a plurality of electric lapping guides (ELG, or sometimes called a resistance lapping guide, RLG) is provided in the bar.

Specifically, as described in Japanese Laid-Open Patent Application No. 2003-91804, for example, a plurality of electric lapping guides is arranged opposite to a face, in which the medium facing surface of the bar is formed, and is formed so that the relative positional relationship with the magneto resistance effect element be known in advance. Then, as this medium facing surface is lapped and the MR height becomes smaller, the electric lapping guide is also ground. Accordingly, the height in the direction perpendicular to the medium facing surface of the electric lapping guide also decreases, so that the electric resistance value of the electric lapping guide will vary corresponding to the grinding amount. For this reason, if a change in the magnitude of the electric resistance value of the electric lapping guide is measured during the lapping process and the lapping is finished when it reached a predetermined electric resistance value, the lapping process can be carried out so as to give a predetermined size of the MR height.

However, in the lapping process using the conventional electric lapping guide, the relative positional relationship between the magneto resistance effect element and the electric lapping guide sometimes deviates from a designed relationship and thus the MR height deviates from the design value accordingly.

Specifically, the relative positional relationship between the magneto resistance effect element and the electric lapping guide is basically determined by a reticle pattern which is used in patterning these. However, when the reticle pattern is transferred to photoresist to form a resist pattern, the shape of the resist pattern will shrink or expand slightly as compared with the pattern in the reticle. The degree of this shrinkage or expansion varies depending on the exposure conditions, such as the reflectivity of photoresist, the type of underlayers, and the focusing position at the time of exposure. Since the patterns of the magneto resistance effect element and electric lapping guide are located far away from each other as compared with the size of the magneto resistance effect element, the exposure conditions for the respective resist patterns for patterning the magneto resistance effect element and electric lapping guide sometimes differ, respectively, and the degrees of shrinkage or expansion of these resist patterns sometimes differ, respectively. For this reason, the relative positional relationship between the patterned magneto resistance effect element and electric lapping guide sometimes deviates.

Moreover, it is also known that the degree of shrinkage or expansion of this resist pattern depends on the size and shape of the resist pattern. Usually, the size of the resist pattern for patterning the magneto resistance effect element is on the order of submicron, while the size of the resist pattern for patterning the electric lapping guide is on the order of several tens of microns, and thus both sizes differ, significantly. For this reason, due to the size difference, the relative positional relationship between the patterned magneto resistance effect element and electric lapping guide sometimes shifts further. In particular, in a hard disk drive unit complying with high recording density, the deviation margin allowed for various characteristics of the constituent elements thereof is extremely small, and thus the degree of deviation of the MR height accompanied by the above-described deviation in the relative positional relationship between the magneto resistance effect element and the electric lapping guide might not be allowed.

Accordingly, the present invention is intended to provide a method of making a magnetic head wherein the size of the MR height can be controlled precisely.

SUMMARY OF THE INVENTION

A method for manufacturing magnetic heads concerning the present invention includes: a resist pattern forming step of forming a resist pattern for magnetic detection element layer for determining an initial height in the direction perpendicular to a medium facing surface of the magnetic detection element layer and a resist pattern for conductive layer for determining an initial height in the direction perpendicular to the medium facing surface of the conductive layer on a substrate having the magnetic detection element layer and the conductive layer spaced apart in a track width direction relative to the magnetic detection element layer by exposure using a reticle, wherein, as a reticle pattern corresponding to the resist pattern for magnetic detection element layer and a reticle pattern corresponding to the resist pattern for conductive layer in the reticle, a reticle having a convex portion that projects in the height direction and a concave portion that dents in the direction opposite to the convex portion, respectively, is used to form a convex portion and concave portion corresponding to the convex portion and concave portion of the reticle pattern in the resist pattern for magnetic detection element layer and in the resist pattern for conductive layer, respectively; an initial height determining step of determining an initial height of the magnetic detection element layer and an initial height perpendicular to the medium facing surface of the conductive layer by removing unnecessary portions of the magnetic detection element layer and the conductive layer with the each resist pattern as a mask, and forming a convex portion and concave portion corresponding to the convex portion and concave portion of the resist pattern in the magnetic detection element layer and in the conductive layer, respectively; a magnetic detection element layer deviation obtaining step of obtaining a deviation in the height direction concerning a surface intersecting the height direction of the magnetic detection element layer, based on a ratio between a width in the track width direction of the convex portion of the magnetic detection element layer and a width in the track width direction of the concave portion of the magnetic detection element layer; a conductive layer deviation obtaining step of obtaining a deviation in the height direction concerning a surface intersecting the height direction of the conductive layer, based on a ratio between a width in the track width direction of the convex portion of the conductive layer and a width in the track width direction of the concave portion of the conductive layer; and a grinding step of grinding the medium facing surface with the conductive layer as a resistance sensor so that a height of the magnetic detection element layer be a desired value, based on the deviation in the height direction of the magnetic detection element layer and the deviation in the height direction of the conductive layer.

According to the present invention, based on the ratio between the widths in the track width direction of the convex portion and concave portion of the magnetic detection element layer, an amount of positional deviation in the direction perpendicular to the medium facing surface of the magnetic detection element layer can be grasped. Moreover, based on the ratio of the widths in the track width direction of the convex portion and concave portion of the conductive layer, an amount of positional deviation in the direction perpendicular to the medium facing surface of the conductive layer can be grasped. Since the magnetic detection element layer and the conductive layer are patterned using one reticle, based on the amount of positional deviation described above, a relative positional relationship in the height direction between the magnetic detection element layer and the conductive layer can be obtained precisely as compared with conventional method. Moreover, since the conductive layer is provided in a position spaced apart in the track width direction relative to the magnetic detection element layer, the medium facing surface can be ground with the conductive layer as a resistance sensor. Then, if the amount of grinding is determined considering the precisely obtained relative positional relationship in the height direction between the magnetic detection element layer and the conductive layer in the grinding, a magnetic head wherein the size of the MR height is precisely controlled can be obtained.

Moreover, it is preferable that the reticle pattern corresponding to the resist pattern for magnetic detection element layer and the reticle pattern corresponding to the resist pattern for conductive layer in the reticle have a plurality of convex portions and concave portions, respectively. Accordingly, the amount of positional deviation in the direction perpendicular to the medium facing surface of the magnetic detection element layer as well as the amount of positional deviation in the direction perpendicular to the medium facing surface of the conductive layer can be grasped using a plurality of convex portions and concave portions, so that the amount of positional deviation can be grasped more precisely. For this reason, a magnetic head wherein the size of the MR height is controlled more precisely can be obtained.

Moreover, it is preferable that among the convex portions and concave portions which the reticle pattern corresponding to the resist pattern for magnetic detection element layer and the reticle pattern corresponding to the resist pattern for conductive layer in the reticle have, the convex portion and concave portion adjoining to each other have a common side edge, respectively. Since this shortens the distance between the convex portion and the concave portion which each reticle pattern has, more convex portions and concave portions can be formed using each resist pattern. For this reason, the amount of positional deviation in the direction perpendicular to the medium facing surface of the magnetic detection element layer as well as the amount of positional deviation in the direction perpendicular to the medium facing surface of the conductive layer can be grasped using more convex portions and concave portions, thus allowing the amount of positional deviation to be grasped more precisely. As a result, a magnetic head wherein the size of the MR height is controlled more precisely can be obtained.

Moreover, it is preferable that the convex portion and concave portion, which the reticle pattern corresponding to the resist pattern for magnetic detection element layer and the reticle pattern corresponding to the resist pattern for conductive layer in the reticle have, be rectangular, square, or trapezoidal. This makes it easy to calculate the amount of positional deviation in the direction perpendicular to the medium facing surface of the magnetic detection element layer from the ratio between the widths in the track width direction of the convex portion and concave portion of the magnetic detection element layer. In the same manner, this makes it easy to calculate the amount of positional deviation in the direction perpendicular to the medium facing surface of the conductive layer from the ratio between the widths in the track width direction of the convex portion and concave portion of the conductive layer.

Moreover, it is preferable that the convex portion and concave portion, which the reticle pattern corresponding to the resist pattern for magnetic detection element layer and the reticle pattern corresponding to the resist pattern for conductive layer in the reticle have, be square. This makes it easy to calculate the amount of positional deviation in the direction perpendicular to the medium facing surface of the magnetic detection element layer from the ratio between the widths in the track width direction of the convex portion and concave portion of the magnetic detection element layer. In a similar manner, this makes it easier to calculate the amount of positional deviation in the direction perpendicular to the medium facing surface of the conductive layer from the ratio between the widths in the track width direction of the convex portion and concave portion of the conductive layer. This also makes it easy to calculate the resistance value of the conductive layer when using the conductive layer, to which the shape of the reticle pattern is substantially transferred, as a resistance sensor.

Moreover, it is preferable that the magnetic detection element layer include an MR element layer and a magnetic domain controlling layer provided at both sides in the track width direction of the MR element layer, and that the resist pattern for magnetic detection element layer cover the MR element layer and magnetic domain controlling layer, and that the convex portion and concave portion of the resist pattern for magnetic detection element layer be formed in a portion that covers the magnetic domain controlling layer. Accordingly, the resist pattern for magnetic detection element layer and the MR element layer will be adjacent to each other. For this reason, based on a ratio between the widths in the track width direction of the convex portion and concave portion, the convex portion and concave portion formed in the magnetic detection element layer by the resist pattern for magnetic detection element layer, the amount of positional deviation in the direction perpendicular to the medium facing surface of the magnetic detection element layer can be grasped more precisely. As a result, a magnetic head wherein the size of the MR height is controlled more precisely can be obtained.

Moreover, it is preferable that the convex portion and concave portion of the resist pattern for magnetic detection element layer be formed in a face at the medium facing surface side of the magnetic domain controlling layer. Accordingly, the convex portion and concave portion, which are formed in the magnetic detection element layer by the resist pattern for magnetic detection element layer, will be removed in the grinding step. Accordingly, in the finished magnetic head, unnecessary convex portion and concave portion formed in the magnetic detection element layer can be removed easily.

According to the present invention, a method of making a magnetic head wherein the size of MR height can be controlled precisely is provided.

BRIEF DESCRIPTION OF THE DRAWINGS

FIG. 5 is a process chart illustrating a part of the method of making the magnetic head 21 concerning an embodiment.

FIG. 6 is a process chart illustrating a part of the method of making the magnetic head 21 concerning the embodiment.

FIG. 12(a) is a view showing a state in which a plurality of magnetic heads 21 is formed on a wafer 2, and FIG. 12(b) is a view showing a state in which a substrate is cut to prepare a plurality of bars 3 with the magnetic heads 21 being arranged in rows.

FIG. 16 is a schematic plan view showing a modification of the reticle patterns 83 and 85.

DESCRIPTION OF THE PREFERRED EMBODIMENTS

Figure 1:
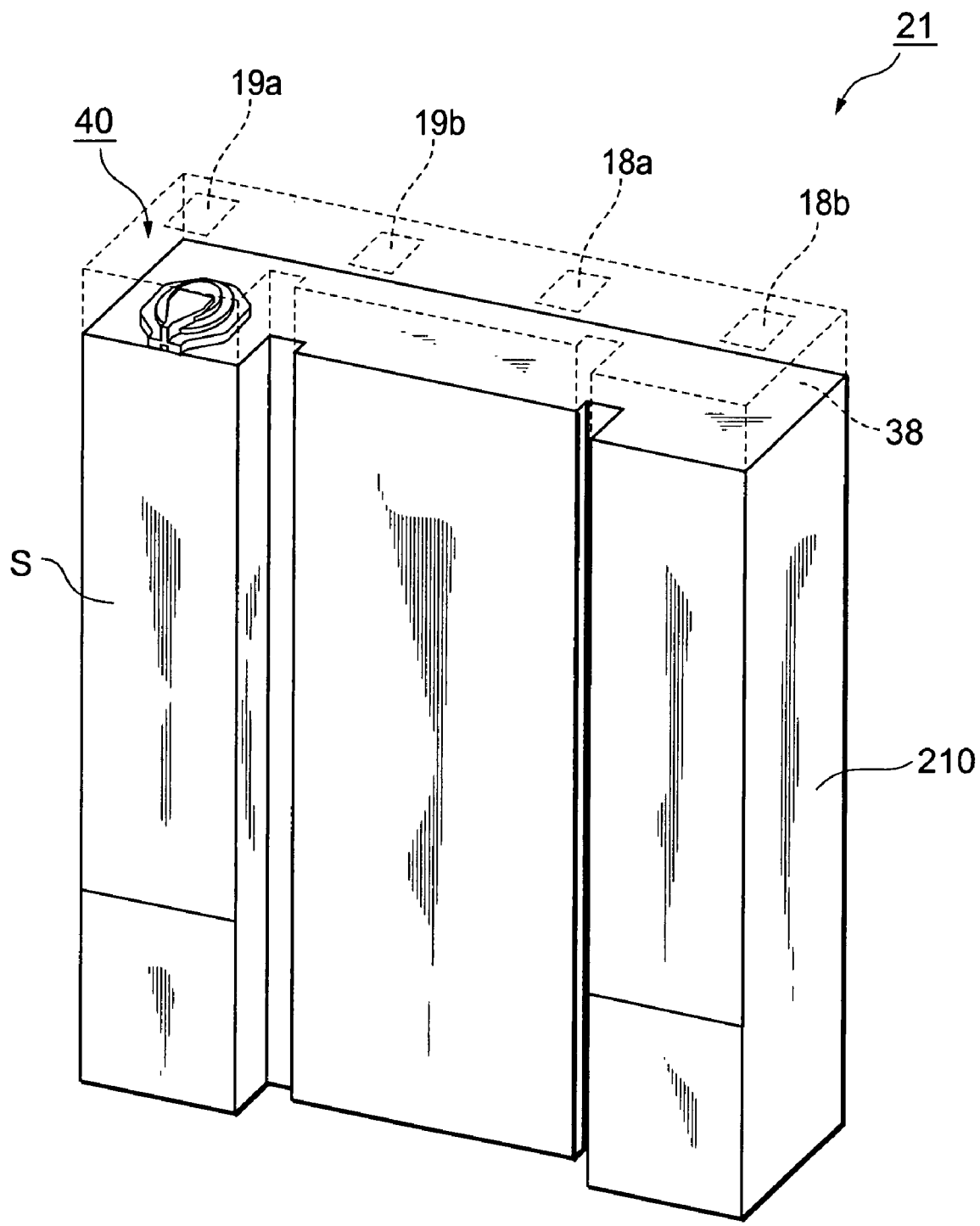
FIG. 1 is a perspective view of a magnetic head 21 as seen from a medium facing surface S side.

Hereinafter, an embodiment of the present invention will be described in detail with reference to the accompanying drawings. In each drawing, the same elements are indicated using the same reference numerals. Moreover, the scale ratios in a constituent element and between constituent elements in the accompanying drawings are arbitrary, respectively, for simplicity of the drawings.

First, a magnetic head obtained by a method of making a magnetic head concerning an embodiment of the present invention will be described.

FIG. 1 is an enlarged perspective view of a magnetic head 21. The magnetic head 21 has a substantially rectangular parallelepiped form, in which a magnetic head part 40 is formed on the side face of a slider substrate 210 made primarily of an AlTiC ($Al_2O_3$.TiC). The front-side face in this view is a medium facing surface S opposed to the recording surface of a magnetic recording medium 10 (see FIG. 2). When the magnetic recording medium 10 rotates, the magnetic head 21 floats up due to an airflow accompanying this rotation, whereby the medium facing surface S separates from the recording surface of the magnetic recording medium 10. In the magnetic head, there is provided an insulating layer 38 as an overcoat layer indicated by broken lines in the view. Recording pads 18a, 18b and reproducing pads 19a, 19b are attached onto the insulating layer 38. In addition, the medium facing surface S may be coated with DLC (Diamond Like Carbon) or the like.

Figure 2:
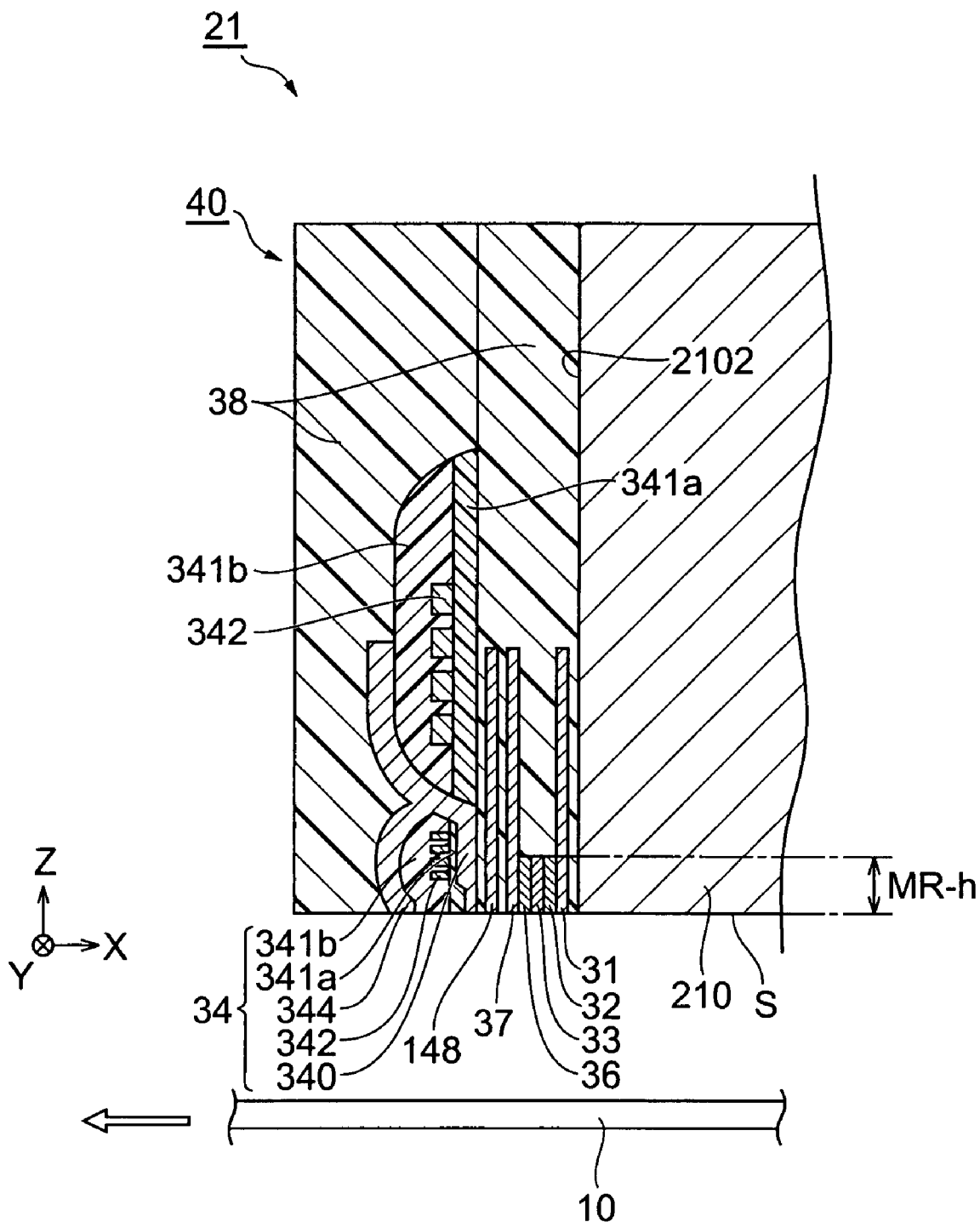
FIG. 2 is a cross sectional view in the direction perpendicular to the medium facing surface S of the magnetic head 21.
Figure 3:
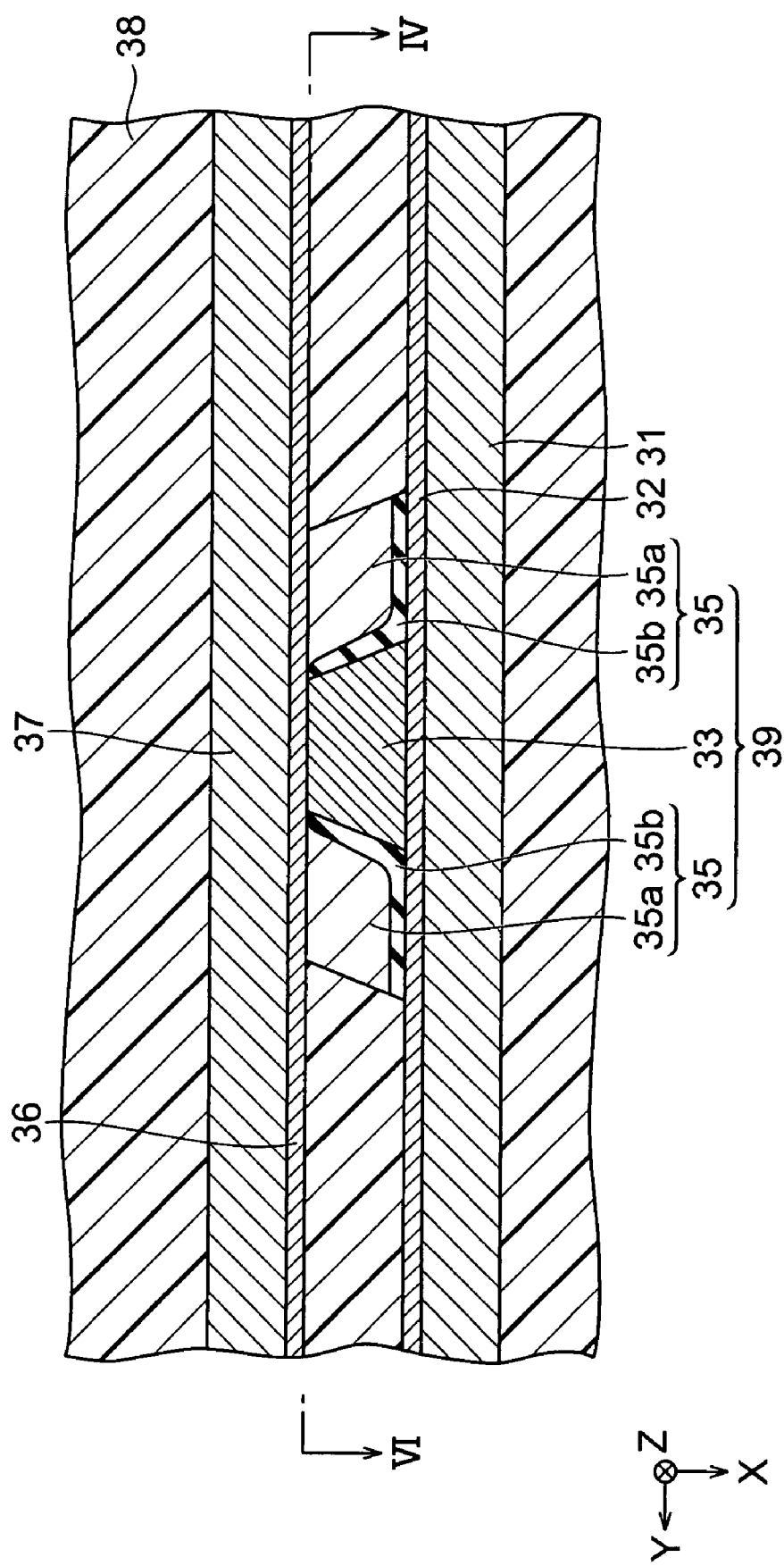
FIG. 3 is a plan view of the magnetic head 21 as seen from the medium facing surface S side.
Figure 4:
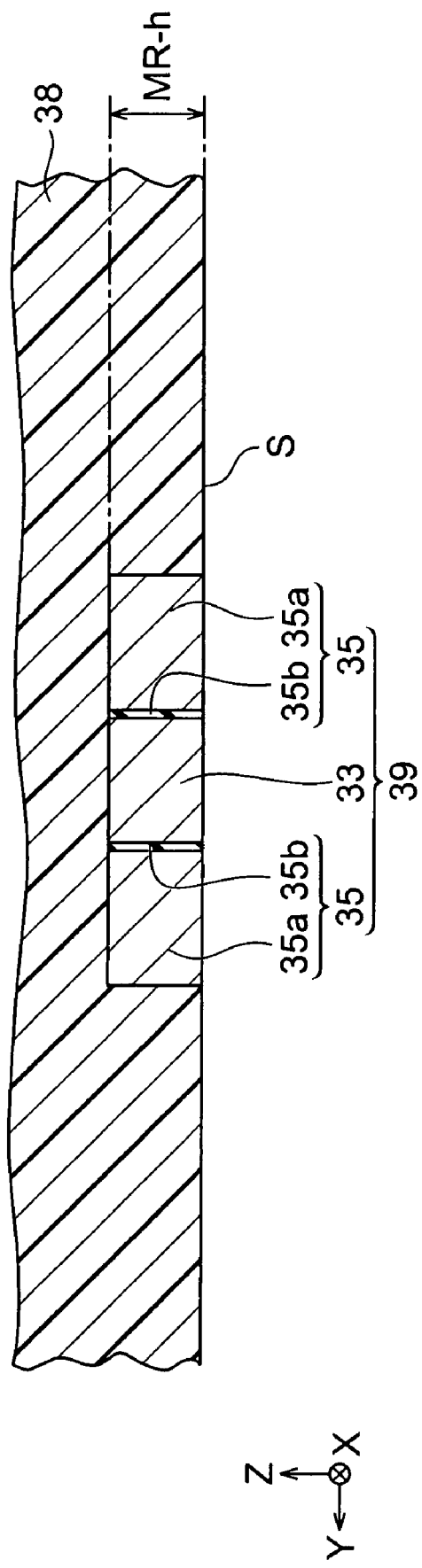
FIG. 4 is a cross sectional view along the VI-VI line of FIG. 3.

FIG. 2 is a cross sectional view in the direction perpendicular to the medium facing surface S of the magnetic head 21 shown in FIG. 1, FIG. 3 is a plan view of the magnetic head 21 as seen from the medium facing surface S side, and FIG. 4 is a cross sectional view along the VI-VI line of FIG. 3.

As shown in FIG. 2, the magnetic head 21 includes the slider substrate 210, and the magnetic head part 40 provided on a side face 2102 of the medium facing surface S in the slider substrate 210.

The magnetic head part 40 has an MR (magneto resistance) element layer 33 as a magnetic detection film disposed between a lower shield layer (lower magnetic shield layer) 31 and an upper shield layer (upper magnetic shield layer) 37, and an electromagnetic coil element 34 as a magnetic recording element.

The lower shield layer 31 and upper shield layer 37 are planar layers that are formed so as to be substantially parallel to the side face 2102 of the slider substrate 210, and the lower shield layer 31 is closer to the slider substrate 210 than the upper shield layer 37. Moreover, the lower shield layer 31 and upper shield layer 37 form a part of the medium facing surface S. Then, the MR element layer 33 is arranged so as to be sandwiched between the lower shield layer 31 and the upper shield layer 37, thus forming a part of the medium facing surface S.

The lower shield layer 31 and upper shield layer 37 can be made of, for example, magnetic material, such as NiFe, CoFeNi, CoFe, FeN, or FeZrN, with a thickness of about 0.5 to 3 μm, which is formed by a pattern plating method including a frame plating method, or the like. The upper and lower shield layers 31 and 37 prevent the MR element layer 33 from being affected by an external magnetic field that makes noise.

The MR element layer 33 is a laminated film that is formed so as to be substantially parallel to the side face 2102 of the slider substrate 210, thus forming a part of the medium facing surface S. The height in the direction (in the height direction) perpendicular to the medium facing surface S of this MR element layer 33 is an MR height (MR-h).

The MR element layer 33 is, for example, a current-perpendicular-to-plane (CPP) type laminated film wherein a sense current flows in the direction perpendicular to the lamination plane, and a tunnel-magneto-resistance (TMR) film or a CPP type GMR (Giant Magneto Resistance) film can be used suitably. By using such magneto resistance effect film as the MR element layer 33, a signal magnetic field from a magnetic disk can be received with extremely high sensitivity.

In case of using the TMR element as the MR element layer 33, the MR element layer is comprised of sequentially laminated layers as follows: an antiferromagnetic layer made of IrMn, PtMn, NiMn, RuRhMn, or the like, with a thickness of about 5 to 15 nm; a magnetization fixed layer whose magnetizing direction is fixed by the antiferromagnetic layer, the magnetization fixed layer being constituted of, for example, CoFe, etc., which is a ferromagnetic material, or of two-layer of CoFe, etc., which sandwich a non-magnetic metal layer made of Ru, etc.; a tunnel barrier layer made of nonmagnetic dielectric material, which is a metal film with a thickness of about 0.5 to 1 nm oxidized, for example, by oxygen that is introduced in a vacuum apparatus, or naturally oxidized, the metal film being made of, for example, Al, AlCu, Mg, etc.; and a free magnetization layer comprised of two-layer films of CoFe, etc., with a thickness of about 1 nm and NiFe with a thickness of about 3 to 4 nm, etc., which are ferromagnetic material, the free magnetization layer forming a tunnel junction between the magnetization fixed layer and the same via the tunnel barrier layer. Moreover, in case of using the CPP type GMR film as the MR element layer 33, the tunnel barrier layer in the above-described TMR film is replaced with a nonmagnetic conductive layer made of Cu, etc., with a thickness of about 1 to 3 nm.

Moreover, as shown in FIG. 2 and FIG. 3, between the lower shield layer 31 and the MR element layer 33 and between the MR element layer 33 and the upper shield layer 37, a lower metal gap layer 32 and an upper metal gap layer 36 are provided, respectively.

These upper and lower metal gap layers 32 and 36 are made of nonmagnetic material and have a function to prevent a magnetic domain controlling layer 35 described below (see FIG. 3) and the upper and lower shield layers 37, 31 from magnetically coupling to each other. Moreover, the upper and lower metal gap layers 32 and 36 are made of conductive material. For this reason, the lower shield layer 31 and MR element layer 33, as well as the MR element layer 33 and upper shield layer 37 are electrically coupled to each other, respectively, and thus the upper and lower shield layers 37, 31 also function as the respective upper and lower electrode layers for supplying a sense current to the MR element layer 33. As the material of the upper and lower metal gap layers 32 and 36, Ru, Ta, or the like can be used, for example.

Moreover, as shown in FIG. 2, between the upper shield layer 37 and the electromagnetic coil element 34, an element-to-element shield layer 148 made of material similar to that of the upper shield layer 37 is formed. The element-to-element shield layer 148 plays a role to shut off the MR element layer 33 from the magnetic field generating from the electromagnetic coil element 34 and thus prevent external noise at the time of reading. Moreover, between the element-to-element shield layer 148 and the electromagnetic coil element 34, a bucking coil part may be formed further. The bucking coil part attempts to generate a magnetic flux for canceling a magnetic flux loop that generates from the electromagnetic coil element 34 and goes through the upper and lower electrode layers of the MR element layer 33, and thereby to suppress a wide adjacent-truck erasing (WATE) phenomenon, which is an unnecessary writing or erasing operation to the magnetic disk.

Between the upper and lower shield layers 37 and 31 opposite to the medium facing surface S of the MR element layer 33, at the opposite side of the medium facing surface S of the upper and lower shield layers 37, 31 and element-to-element shield layer 148, between the lower shield layer 31 and the slider substrate 210, and between the element-to-element shield layer 148 and the electromagnetic coil element 34, insulating layers 38 made of alumina or the like are formed.

The electromagnetic coil element 34 is preferably the one used for perpendicular magnetic recording, and as shown in FIG. 2, includes a main magnetic pole layer 340, a gap layer 341a, a coil insulation layer 341b, a coil layer 342, and an auxiliary magnetic pole layer 344.

The main magnetic pole layer 340 is a magnetic guidance path for focusing and guiding a magnetic flux induced by the coil layer 342 to a recording layer of the magnetic recording medium 10, to which writing is carried out. Here, the width in the track width direction (direction along the Y-axis in FIG. 2) and thickness in the laminating direction (direction along the X-axis in FIG. 2) of the edge at the medium facing surface S side of the main magnetic pole layer 340 are preferably made smaller as compared with the other portion. As a result, a fine and strong writing magnetic field corresponding to higher recording density can be generated.

The edge at the medium facing surface S side of the auxiliary magnetic pole layer 344 that is magnetically coupled with the main magnetic pole layer 340 forms a trailing shield part whose layer cross section is wider than other portion of the auxiliary magnetic pole layer 344. The auxiliary magnetic pole layer 344 is opposed to the edge at the medium facing surface S side of the main magnetic pole layer 340 via the gap layer 341a and coil insulation layer 341b formed of insulating material, such as alumina. Provision of such auxiliary magnetic pole layer 344 makes the magnetic field gradient steeper between the auxiliary magnetic pole layer 344 and the main magnetic pole layer 340 in the vicinity of the medium facing surface S. As a result, a jitter on the signal output decreases and thus the error rate at the time of reading can be reduced.

The auxiliary magnetic pole layer 344 is made of an alloy composed of two or three out of Ni, Fe, and Co, which are formed with a thickness of about 0.5 μm to about 5 μm using, for example, a frame plating method, a sputtering method, or the like, or is made of an alloy, into which a prescribed element is added, with these metal being the main ingredients.

The gap layer 341a separates the coil layer 342 and the main magnetic pole layer 340 to each other and is made of, for example, $Al_2O_3$, DLC, etc., with a thickness of about 0.01 μm to about 0.5 μm, which is formed by, for example, a sputtering method, CVD, or the like.

The coil layer 342 is made of, for example, Cu, etc., with a thickness of about 0.5 μm to about 3 μm, which is formed by, for example, a frame plating method or the like. The rear end of the main magnetic pole layer 340 and the portion of the auxiliary magnetic pole layer 344, the portion being away from the medium facing surface S, are coupled to each other, and the coil layer 342 is formed so as to surround this coupling portion.

The coil insulation layer 341b separates the coil layer 342 and the auxiliary magnetic pole layer 344 to each other and is made of, for example, electrical insulation material such as a heat cured alumina or resist layer with a thickness of about 0.1 μm to about 5 μm.

Moreover, at the opposite side of the slider substrate 210 side of the electromagnetic coil element 34, the insulating layer 38 as the overcoat layer is formed so as to cover the electromagnetic coil element 34.

As shown in FIG. 3 and FIG. 4, at both sides in the track width direction (the direction along the Y-axis in FIGS. 3 and 4) of the MR element layer 33, the magnetic domain controlling layer 35 that turns the free magnetization layer of the MR element layer 33 into a single magnetic domain by applying a bias magnetic field to the MR element layer 33 is formed.

Moreover, as shown in FIG. 4, the magnetic domain controlling layer 35, whose height in the height direction is made the same as that of the MR height (MR-h), forms a part of the medium facing surface S. This magnetic domain controlling layer 35 is comprised of a bias magnetic field layer 35a made of ferromagnetic material, such as CoTa, CoCrPt, or CoPt, and an insulating isolation layer 35b made of insulating material such as $Al_2O_3$. The insulating isolation layer 35b is provided for electrically insulating between the bias magnetic field layer 35a and the MR element layer 33 as well as between the bias magnetic field layer 35a and the lower metal gap layer 32. Accordingly, when a sense current for the MR element layer 33 is fed from the upper shield layer 37 (upper electrode layer) to the lower shield layer 31 (lower electrode layer), the sense current is prevented from going through the bias magnetic field layer 35a, so that the sense current flows intensively into the MR element layer 33. Then, the MR element layer 33 and the magnetic domain controlling layer 35 constitute the magnetic detection element layer 39.

(Manufacturing Method)

Next, the method of making a magnetic head concerning the embodiment will be described with reference to FIG. 5 to FIG. 13. For forming each layer, a sputtering method can be used, but other than this, a chemical vapor phase growth (CVD) method, an electric field plating method, or the like can be also used. Moreover, for etching, IBE (ion beam etching), RIE (reactive ion etching), or dry etching such as a sputtering method using a rare gas, can be used, but chemical etching (wet etching) can be also used.

In FIG. 5, FIG. 6, FIG. 9, and FIG. 10, (a) of each figure is a plan view of a magnetic head intermediate, and (b) of each figure is a cross sectional view of the plan view of (a).

First, as shown in FIG. 5, in the whole surface above the slider substrate 210, the insulating layer 38, lower shield layer 31, and lower metal gap layer 32 are formed in this order. Then, above the lower metal gap layer 32, the patterned laminated film 33 serving as the MR element layer and the patterned conductive layer 30 serving as an electric lapping guide described below are deposited so as to be spaced apart from each other in the track width direction (the right and left directions in FIG. 5).

Next, as shown in FIG. 6, above the MR element layer 33, two magnetic domain controlling layers 35 including the insulating isolation layer 35b and bias magnetic field layer 35a are formed so as to be spaced apart from each other in the track width direction and have substantially the same thickness as that of the surrounding MR element layer 33.

Figure 7:
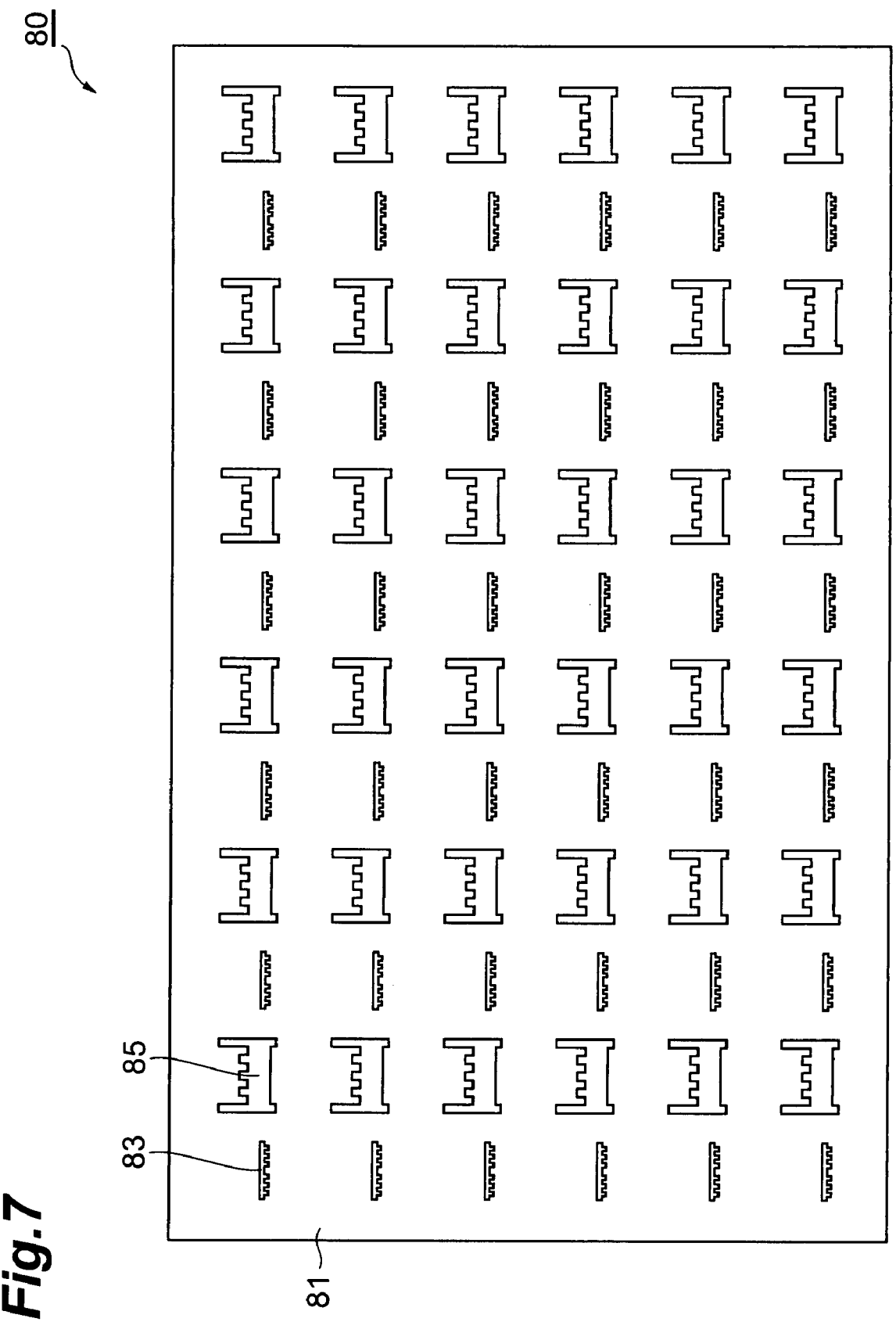
FIG. 7 is a schematic plan view of a reticle 80 used in the method of making the magnetic head 21 concerning the embodiment.
Figure 8:
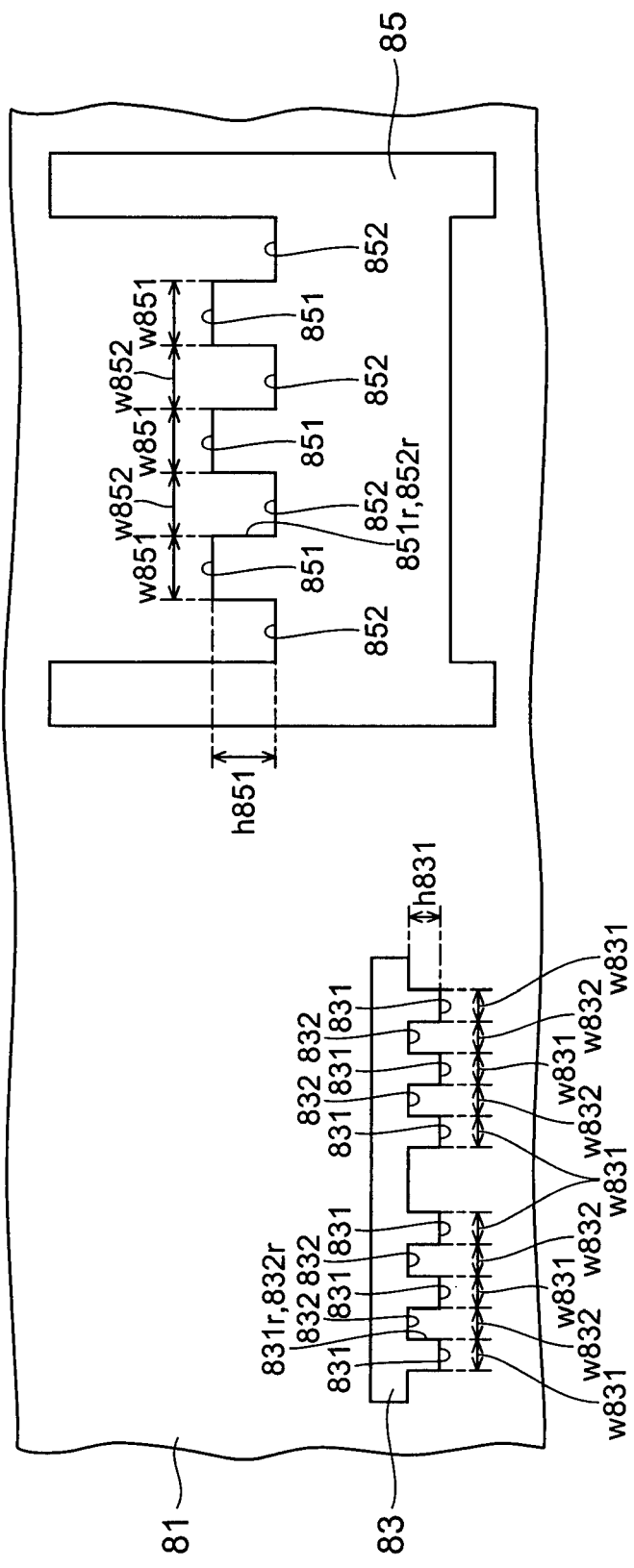
FIG. 8 is a partially enlarged view of FIG. 7.

Next, a reticle as shown in FIG. 7 and FIG. 8 is prepared. FIG. 7 is a schematic plan view of a whole reticle 80, and FIG. 8 is a partially enlarged view of FIG. 7.

As shown in FIG. 7, in the reticle 80, a combination of a reticle pattern 83 for the magnetic detection element layer 39 (see FIG. 4) and a reticle pattern 85 for the conductive layer 30 is arranged in a grid form. In the case where a positive resist is used as the resist for forming resist patterns 70a, 70b described below, the reticle patterns 83 and 85 serve as mask regions for blocking the light at the time of exposure, and the other region 81 serves as a light transmission region. In contrast, in the case where a negative resist is used, the reticle patterns 83 and 85 serve as the light transmission region and other region 81 serves as the mask area.

Moreover, as shown in FIG. 8, the reticle pattern 83 has a plurality of convex portions 831 that project downward in the view and a plurality of concave portions 832 that dent upward in the view. Then, the ratio between a width w831 of the convex portion 831 and a width w832 of the concave portion 832 is set to a predetermined ratio, preferably 1:1. Moreover, it is preferable that a height h831 of the convex portion 831 be almost the same as w831 and w832, i.e., the convex portion 831 and the concave portion 832 are square, respectively. Then, a side edge 831r of the convex portion 831 and a side edge 832r of the concave portion 832 serve as a common side edge.

Moreover, the reticle pattern 85 has a plurality of convex portions 851 that project upward in the view and a plurality of concave portions 852 that dent downward in the view. Then, the ratio between a width w851 of the convex portion 851 and a width w852 of the concave portion 852 is set to a predetermined ratio, preferably 1:1. Moreover, it is preferable that a height h851 of the convex portion 851 be almost the same as w851 or w852, i.e., the convex portion 851 and the concave portion 852 be square, respectively, because the calculation of the resistance value of the electric lapping guide 30 (see FIG. 10), to which the shape of the reticle pattern 85 is substantially transferred, becomes easy. Then, a side edge 851r of the convex portion 851 and a side edge 852r of the concave portion 852 serve as a common side edge.

Figure 9:
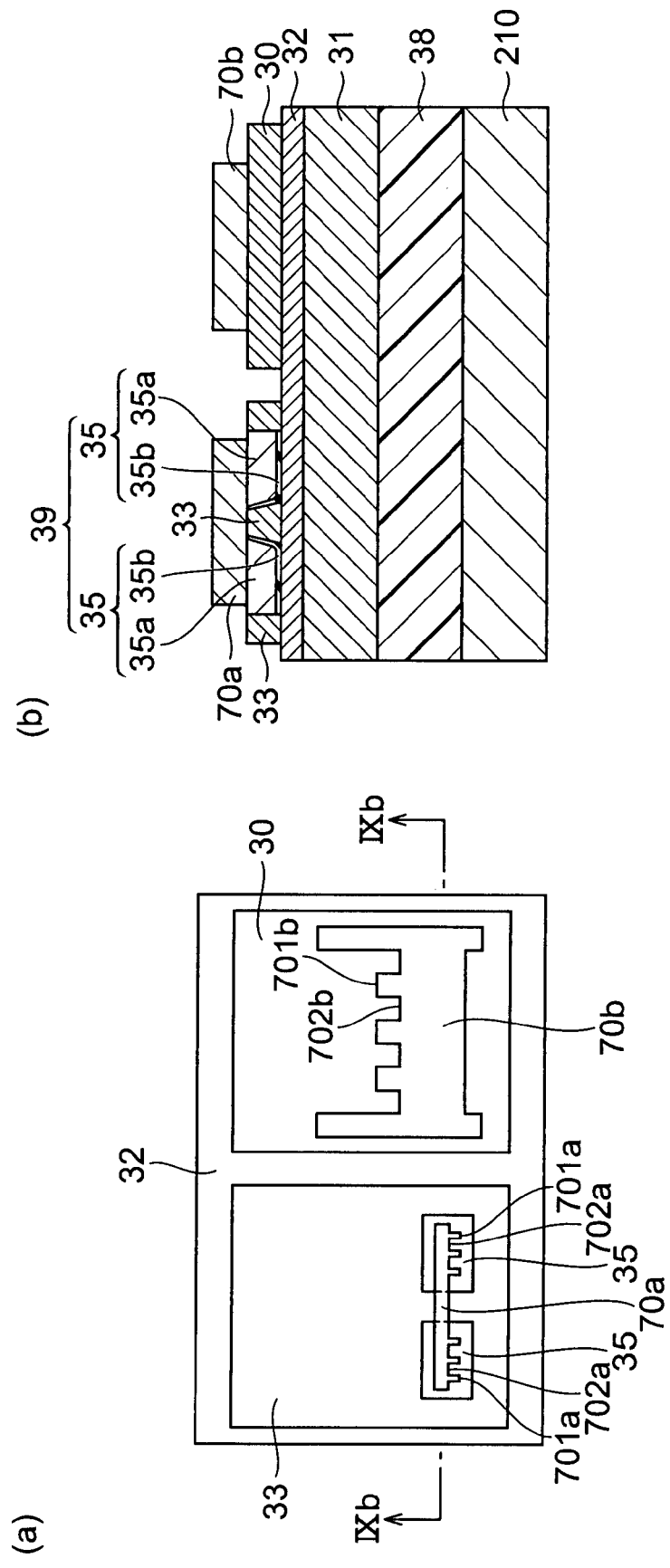
FIG. 9 is a process chart illustrating a part of the method of making the magnetic head 21 concerning the embodiment.

Next, as shown in FIG. 9, resist patterns 70a and 70b are formed using the above-described reticle 80. Specifically, after applying photoresist to the entire substrate surface, exposure and development are carried out so that the reticle pattern 83 (see FIG. 8) of the reticle 80 covers a part of two magnetic domain controlling layers 35 and a part of the MR element layer 33 between two magnetic domain controlling layers 35 (i.e., a part of the magnetic detection element layer 39), and also the reticle pattern 85 (see FIG. 8) of the reticle 80 covers a part of the conductive layer 30. Accordingly, the resist pattern 70a having a convex portion 701a and concave portion 702a corresponding to the convex portion 831 and concave portion 832 of the reticle pattern 83 of the reticle 80 is formed. In a similar manner, the resist pattern 70b having a convex portion 701b and concave portion 702b corresponding to the convex portion 851 and concave portion 852 of the reticle pattern 85 of the reticle 80 is formed.

Figure 10:
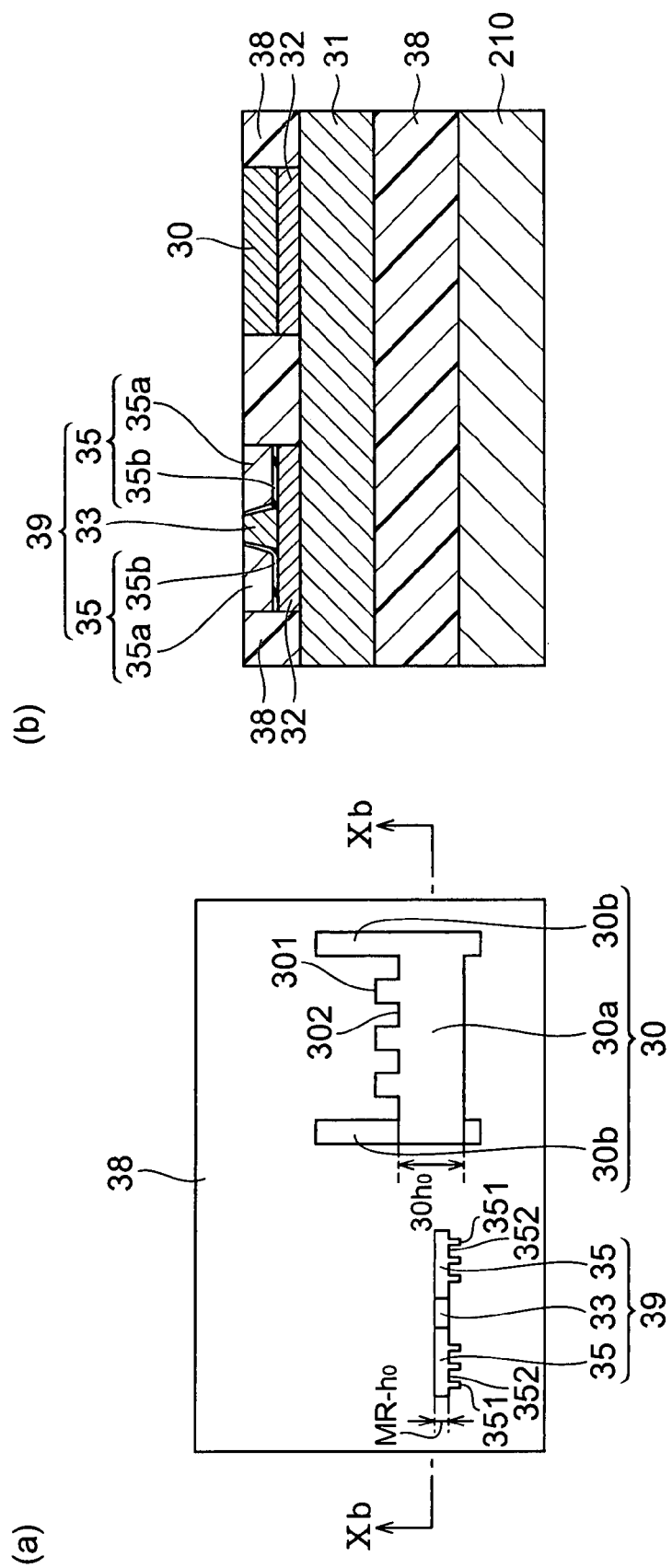
FIG. 10 is a process chart illustrating a part of the method of making the magnetic head 21 concerning the embodiment.

Next, as shown in FIG. 10, with the resist patterns 70a and 70b being as a mask, the whole MR element layer 33 and magnetic detection element layer 39 (magnetic domain controlling layer 35 and conductive layer 30) in a region that is not masked are etched, and the insulating layer 38 is deposited in this etched region and then the resist patterns 70a and 70b are removed. Accordingly, in the magnetic detection element layer 39, a convex portion 351 and concave portion 352 corresponding to the convex portion 701a and concave portion 702a of the resist pattern 70a are formed. Moreover, in the conductive layer 30, a convex portion 301 and concave portion 302 corresponding to the convex portion 701b and concave portion 702b of the resist pattern 70b are formed, which constitute the electric lapping guide 30 comprised of a sensor layer 30a and electrode layers 30b to be used in the grinding step described below.

Moreover, in this step, an initial MR height MR-$h_0$ and an initial ELG height 30$h_0$ are determined, which are initial values of the height in the direction (the vertical direction in FIG. 10) perpendicular to the face to serve as the medium facing surface of the magnetic detection element layer 39 and conductive layer (electric lapping guide) 30. The initial ELG height 30$h_0$ is set to be greater than the initial MR height MR-$h_0$, wherein the initial ELG height 30$h_0$ is 20 to 30 μm, for example, and the initial MR height MR-$h_0$ is set to 1 to 3 μm, for example.

Figure 11:
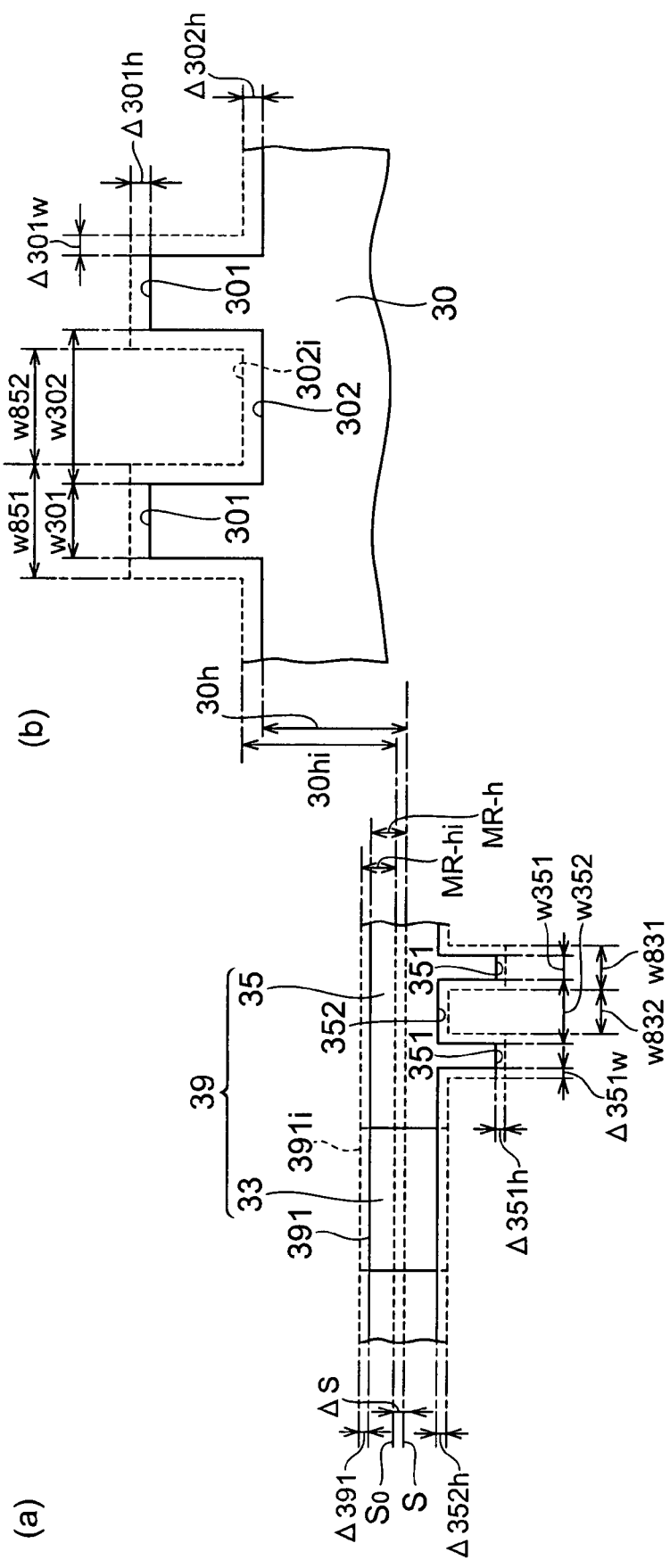
FIG. 11 is a schematic view showing a relationship between a magnetic detection element layer 39 and a conductive layer 30 in an intermediate of the magnetic head 21.

Next, deviations of the height in the direction perpendicular to the medium facing surface S of the magnetic detection element layer 39 and conductive layer (electric lapping guide) 33 are obtained, and the method thereof is described using FIG. 11.

In FIG. 11, a part of the patterned magnetic detection element layer 39 (MR element layer 33 and magnetic domain controlling layer 35) and a part of the patterned conductive layer 30 (electric lapping guide 30), the parts being formed in the above-described step, are shown with solid lines, respectively. The shapes of the magnetic detection element layer 39 and conductive layer 30 are basically determined by the shapes of the reticle pattern 83 and reticle pattern 85 of the reticle 80 (see FIG. 8). However, when patterning these, the shapes of the resist patterns 70a and 70b (see FIG. 9) may shrink or expand slightly, thus producing deviations from the shapes of the reticle patterns 83 and 85 (the shapes of the magnetic detection element layer 39 and conductive layer 30 formed exactly as in the reticle pattern is indicated with dotted lines in FIG. 11. Moreover, FIG. 11 shows an example in the case where the resist patterns 70a and 70b are shrunk. However, the similar thing can be said also in the case where both are expanded, or in the case where one of them is expanded and the other is shrunk.) In addition, the magnitude of the deviation will vary depending on the exposure conditions, such as the reflectivity of photoresist, the type of underlayers, and the focusing position at the time of exposure, the shape of the resist pattern, and the like. For this reason, the magnitude of the deviation will also differ between the magnetic detection element layer 39 and conductive layer 30 formed at the positions that are spaced apart from each other greatly as compared with the element size, the shape of the magnetic detection element layer 39 and conductive layer 30 also being different from each other. In addition, the degree of shrinkage or expansion of the resist pattern may differ for each resist pattern, and moreover, the degree of shrinkage and expansion in the same resist pattern may be isotropic, and the boundary surface of the resist pattern may move backward or forward by the same length in the direction perpendicular to the boundary surface at each place.

In this embodiment, in the subsequent grinding step, the lower portion of the view than S of FIG. 11 is ground to form the medium facing surface S, and in order to calculate the grinding amount required at this time, first, how much a face 391 opposed to the medium facing surface S of the magnetic detection element layer 39 deviates from a face 391i, which is a design position in the reticle pattern 83 (see FIG. 8), is detected by the following method.

Namely, first, a width w351 in the track width direction (the right and left directions in FIG. 11) of the convex portion 351 and a width w352 in the track width direction of the concave portion 352, which the magnetic detection element layer 39 has, are measured with a Critical-Dimension SEM or the like, and the ratio thereof (w351/w352) is calculated. In this case, because a plurality of convex portions 351 and a plurality of concave portions 352 are provided, the width w351 and width w352 at two or more places are measured and by using the mean value thereof, the ratio (w351/w352) is calculated.

Since the design values of the width w351 and width w352 in the reticle pattern 83 are w832 and w831 (see FIG. 8), if neither shrinkage nor expansion of the resist patterns 70a and 70b (see FIG. 9) has occurred, the above-described ratio (w351/w352) will be one. However, like an example shown in FIG. 11, if the resist pattern 70a is shrunk, the above-described ratio (w351/w352) will be less than one. In contrast, if the resist patterns 70a and 70b are expanded, the above-described ratio (w351/w352) will be greater than one.

Then, from the value of this ratio (w351/w352), a deviation width $\Delta 351w$ from the design value in the track width direction of the convex portion 351 can be calculated. Specifically, $w352=w832+2\Delta 351w$, $w351=w831-2\Delta 351w$, and calculation of (w351/w352) gives $\Delta 351w=(w352\cdot w831-w351\cdot w832)/(2(w352+w351))=(w831-w832\cdot(w351/w352))/(2(1+(w351/w352)))$. Then, since the degree of shrinkage and expansion in each region of the same resist pattern may be the same, any one of a deviation $\Delta 351h$ from the design position in the direction (the vertical direction of FIG. 11) perpendicular to the medium facing surface S of the convex portion 351, a deviation $\Delta 352h$ from the design position in the direction perpendicular to the medium facing surface S of the concave portion 352, and a deviation $\Delta 391$ from the design position (position of the face 391i) of the face 391, may be equal to $\Delta 351w$. In this way, the deviation $\Delta 391$ between the face 391 and the face 391i can be detected.

Next, how much the face 302 (concave portion 302) opposed to the medium facing surface S of the conductive layer 30 has shifted from a face 302i, which is a design position in the reticle pattern 85 (see FIG. 8), is detected by the same method as that of the above-described detection of the deviation between the face 391 and the face 391i.

In other words, a width w301 in the track width direction (the right and left directions in FIG. 11) of the convex portion 301 and a width w302 in the track width direction of the concave portion 302, which the conductive layer 30 has, are measured by a Critical-Dimension SEM or the like, and the ratio thereof (w301/w302) is calculated. In this case, the width w351 and the width w352 at two or more places are measured, and by using the mean value thereof, the ratio (w301/w302) is calculated.

Since the design values of the width w301 and the width w302 in the reticle pattern 85 are w852 and w851 (see FIG. 8), if shrinkage or expansion of the resist pattern 70b (see FIG. 9) has occurred, the above-described ratio (w301/w302) will be less than one or greater than one.

Then, from the value of this ratio (w301/w302), a deviation width $\Delta 301w$ from the design value in the track width direction of the convex portion 301 can be calculated. Specifically, $w302=w832+2\Delta 301w$, $w301=w851-2\Delta 301w$, and calculation of (w301/w302) gives $\Delta 301w=(w302\cdot w851-w301\cdot w852)/(2(w302+w301))=(w851-w852\cdot(w301/w302))/(2(1+(w301/w302)))$. Then, both of a deviation $\Delta 301h$ from the design position in the direction perpendicular to the medium facing surface S (the vertical direction in FIG. 11) of the convex portion 301 and a deviation $\Delta 302h$ from the design position in the direction perpendicular to the medium facing surface S of the face 302 (concave portion 302) may be equal to $\Delta 301w$. In this way, the magnitude of the deviation between the face 302 and the face 302i can be detected.

As described above, if the deviations of the height in the direction perpendicular to the medium facing surface S of the magnetic detection element layer 39 and conductive layer (electric lapping guide) 33 are detected, the grinding amount to be ground in the grinding step described below can be calculated accurately.

Namely, in FIG. 11, let the design position of the medium facing surface be $S_0$, and then the distance from the face 391i to $S_0$ is the design value MR-hi of the MR height. However, as described above, because the face 391i actually has shifted to the position of the face 391, the position of the medium facing surface needs to be shifted by the same magnitude as this deviation $\Delta 391$. In other words, the position of S that has shifted by $\Delta S (=\Delta 391)$ from the position of the medium facing surface $S_0$ on design needs to be taken as the medium facing surface.

Then, the magnitude of the resistance value of the electric lapping guide 30 used as the resistance sensor in the grinding step described below is determined by the height to the face 302 (concave portion 302) in the direction perpendicular to the medium facing surface S of the electric lapping guide 30. However, as described above, the position of the face 302 of the electric lapping guide 30 has shifted from the position of the face 302$i$, i.e., the design position, to the position of the face 302, by Δ302$h$.

Accordingly, in FIG. 11, despite that on design the grinding was scheduled to be finished when the electric lapping guide 30 becomes the height of 30$hi$ corresponding to the distance from the face 302$i$ to $S_O$, if the grinding is finished when the electric lapping guide 30 becomes the height of 30$h$ corresponding to the distance from the face 302 to S, then MR-hi that is the magnitude of the MR height on design and MR-h that is the magnitude of the actual MR height can be made the same. In this way, the amount to be ground in the grinding step described below can be determined.

With the steps so far, a part of the magnetic head 21 can be formed. Subsequently, on top of the magnetic head intermediate shown in FIG. 10, the upper metal gap layer 36, upper shield layer 37, and insulating layer 38 as shown in FIG. 4 are formed, and then the electromagnetic coil element 34 and insulating layer 38 are formed, and the recording pads 18$a$, 18$b$ and reproducing pads 19$a$, 19$b$ for the purpose of connection as shown in FIG. 1 are formed. The reproducing pads 19$a$, 19$b$ are electrically connected to the upper shield layer 37, i.e., the upper electrode of the MR element layer 33, and the lower shielding 31, i.e., the lower electrode, respectively, and a sense current can be fed to the MR element layer 33 by applying a voltage between the reproducing pads 19$a$ and 19$b$. Moreover, the recording pads 18$a$ and 18$b$ are electrically connected to both ends of the electromagnetic coil element 34, respectively, and by applying a voltage between the recording pads 18$a$ and 18$b$, the electromagnetic coil element 34 can be energized to generate a writing magnetic field.

The above steps are supposed to be carried out simultaneously to a large number of regions on the wafer 2, which becomes the slider substrate 210, and thereby, as shown in FIG. 12 ($a$), a large number of magnetic heads 21 and electric lapping guides 30 are formed on the wafer 2 in a matrix, the electric lapping guide 30 being arranged in a position spaced apart in the track width direction from the magnetic head 21.

Next, as shown in FIG. 12($b$), the bars 3 are cut out from the wafer 2 using a dicing saw, for example, with the track width direction being the longitudinal direction.

Subsequently, the bar 3 is ground using the electric lapping guide 30 as the grinding amount sensor and the size of the MR height is adjusted. This step is described using FIG. 13.

Figure 13:
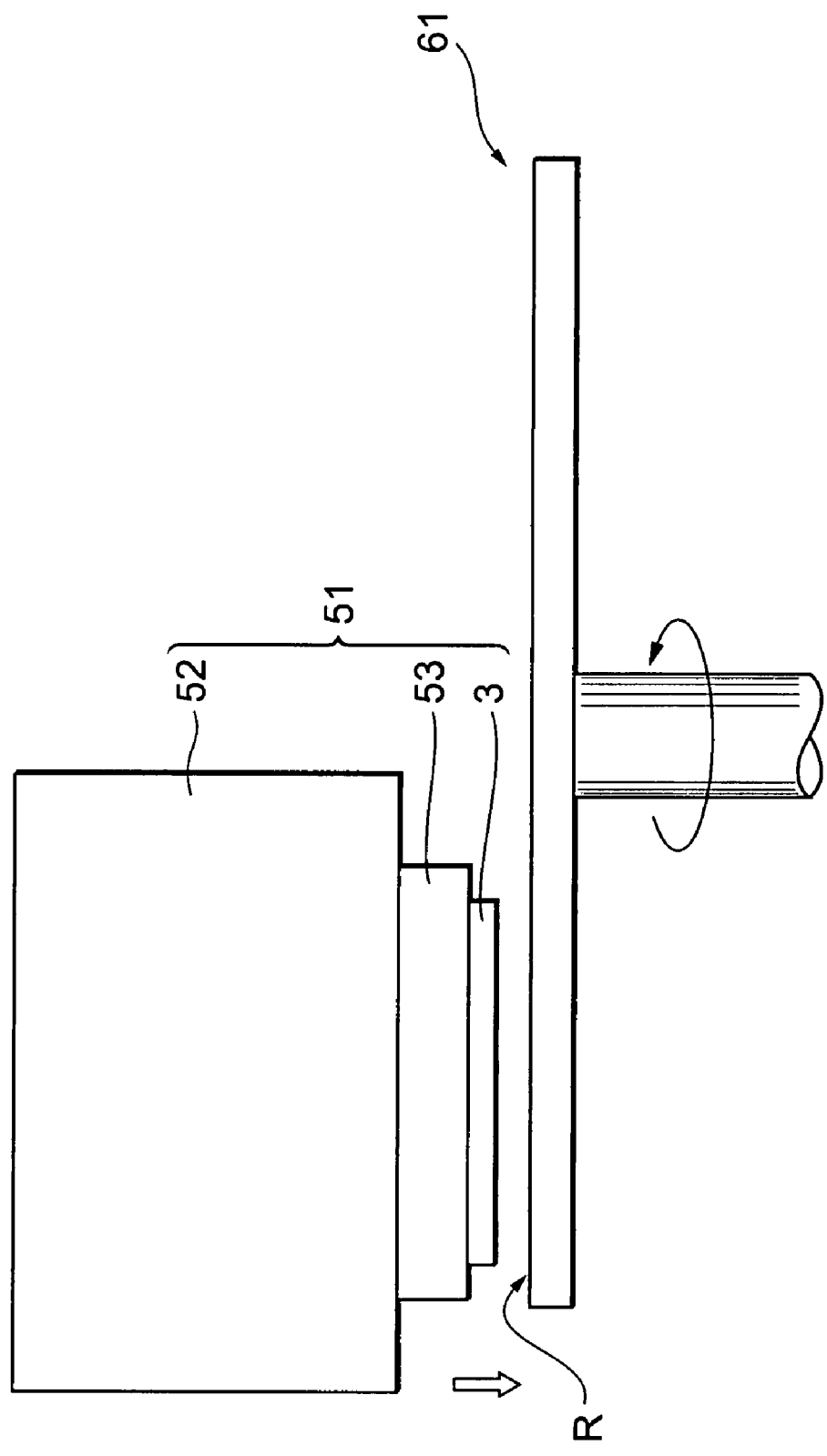
FIG. 13 is a schematic view showing a state, in which the bar 3 is attached to a lapping device 51 used in the step of lapping the bar 3.

FIG. 13 is a schematic view showing a state, in which the bar 3 is attached to a lapping device 51 used in the grinding step. The lapping device 51 includes a main body 52, a holding part 53 for holding the bar 3, and a grinding machine 61 for grinding the bar 3.

In lapping the bar 3, the bar 3 is first attached to the holding part 53 of the lapping device 51. Next, the main body 52 is lowered to make the face, in which the medium facing surface S of the bar 3 is to be formed, in contact with a rotating grinding surface R in the grinding machine 61. Then, the medium facing surface S of the bar 3 is lapped while measuring the electric resistance value of the sensor layer 30$a$ (see FIG. 10($a$)) of the electric lapping guide 30 through the electrode layer 30$b$ (see FIG. 10($a$)) of the electric lapping guide 30. Since the sensor layer 30$a$ of the electric lapping guide 30 is also ground as the lapping proceeds, the resistance value of the sensor layer 30$a$ will increase. Accordingly, from the resistance value, the grinding amount at this point can be measured, so that if the grinding is finished when the grinding amount reached a value corresponding to the grinding amount to be ground, which was determined in the above-described step, while measuring the resistance value of the sensor layer 30$a$, then the grinding can be carried out so as to give a predetermined MR height.

Subsequently, the individual magnetic head 21 is cut out from the bar 3 using, for example, a dicing saw, thus completing the magnetic head 21.

In the magnetic head 21 manufactured with the making method concerning this embodiment, the MR height can be controlled precisely by the following reasons.

Namely, in this embodiment, based on a ratio between the widths in the track width direction of the convex portion 351 and concave portion 352 (see FIG. 11) of the magnetic detection element layer 39, the amount of positional deviation in the direction perpendicular to the medium facing surface S of the magnetic detection element layer 39 is grasped. Moreover, based on the ratio between the widths in the track width direction of the convex portion 301 and concave portion 302 of the conductive layer (electric lapping guide) 30, the amount of positional deviation in the direction perpendicular to the medium facing surface S of the conductive layer 30 is grasped. Then, the magnetic detection element layer 39 and the conductive layer 30 are patterned using one reticle. For this reason, based on the above-described amount of positional deviation, a relative positional relationship in the height direction between the magnetic detection element layer 39 and the conductive layer 30 is obtained precisely as compared with the conventional method. Moreover, the medium facing surface S is ground with the conductive layer 30 as the resistance sensor, the conductive layer 30 being provided at a position spaced apart in the track width direction relative to the magnetic detection element layer 39. Then, since during this grinding, the amount of grinding is determined considering a relative positional relationship in the height direction between the magnetic detection element layer 39 and the conductive layer 30, the relative positional relationship being obtained precisely, the magnetic head 21 wherein the size of the MR height is controlled precisely can be obtained.

Moreover, in this embodiment, the reticle pattern 83 corresponding to the resist pattern 70$a$ for magnetic detection element layer 39 and the reticle pattern 85 corresponding to the resist pattern 70$b$ for conductive layer 30 in the reticle 80 have a plurality of convex portions 831, 851 and a plurality of concave portions 832, 852, respectively (see FIG. 7 and FIG. 8). For this reason, the amount of positional deviation in the direction perpendicular to the medium facing surface S of the magnetic detection element layer 39 and the amount of positional deviation in the direction perpendicular to the medium facing surface S of the conductive layer 30 can be grasped by using a plurality of convex portions 351, 301 and a plurality of concave portions 352, 302, so that these amount of positional deviation can be grasped more precisely (see FIG. 11). Accordingly, the magnetic head 21 wherein the size of the MR height is controlled more precisely can be obtained.

Moreover, in this embodiment, among the convex portions 831, 851 and the concave portions 832, 852 which the reticle pattern 83 and reticle pattern 85 have, the mutually adjoining convex portions 831, 851 and concave portions 832, 852 have the common side edges 831$r$, 832$r$ and side edges 851$r$, 852$r$, respectively (see FIG. 7 and FIG. 8). Since this reduces the distance between the convex portions 831, 851 and concave portion 832, 852, respectively, which the reticle patterns 83, 85 each have, it is possible to form more convex portions 831, 851 and concave portions 832, 852 by the resist patterns 83, 85, each. Accordingly, the amount of positional deviation in the direction perpendicular to the medium facing surface S of the magnetic detection element layer 39 and the amount of positional deviation in the direction perpendicular to the medium facing surface S of the conductive layer 30 can be grasped by using more convex portions 351, 301 and more concave portions 352, 302, so that these amount of positional deviation can be grasped more precisely (see FIG. 11). As a result, a magnetic head wherein the size of the MR height is controlled more precisely can be obtained.

Moreover, in this embodiment, the shapes of the convex portions 831, 851 and concave portions 832 and 852, which the reticle pattern 83 corresponding to the resist pattern 70a for magnetic detection element layer 39 and the reticle pattern 85 corresponding to the resist pattern 70b for conductive layer 30 in the reticle 80 have, respectively, are square (see FIG. 8). This makes it simple to calculate the amount of positional deviation in the direction perpendicular to the medium facing surface S of the magnetic detection element layer 39, and the amount of positional deviation in the direction perpendicular to the medium facing surface S of the conductive layer 30. This also makes it simple to calculate the resistance value of the electric lapping guide 30, to which the shape of the reticle pattern 85 is substantially transferred (see FIG. 10).

Moreover, in this embodiment, the resist pattern 70a for magnetic detection element layers 39 covers the MR element layer 33 and magnetic domain controlling layer 35, and the convex portion 701a and concave portion 702a of the resist pattern 70a for magnetic detection element layers 39 are formed in a portion that covers the magnetic domain controlling layer 35 (see FIG. 9(a)). This causes the resist pattern 70a for magnetic detection element layer 39 and the MR element layer 33 to adjoin to each other. For this reason, based on a ratio between the widths in the track width direction of the convex portion 351 and concave portion 352, the convex portion 352 and concave portion 352 being formed in the magnetic detection element layer 39 by the resist pattern for magnetic detection element layer 39, the amount of positional deviation in the direction perpendicular to the medium facing surface S of the magnetic detection element layer 39 can be grasped more precisely. As a result, the magnetic head 21 wherein the size of the MR height is controlled more precisely can be obtained.

Moreover, in this embodiment, the convex portion 701a and concave portion 702a of the resist pattern 70a for magnetic detection element layers 39 are formed in the face of the medium facing surface S side of the magnetic domain controlling layer 35 (see FIG. 9(a)). For this reason, the convex portion 351 and concave portion 352, which are formed in the magnetic detection element layer 39 by the resist pattern 70a for magnetic detection element layers 39, are removed in the grinding step. For this reason, the convex portion 351 and concave portion 352, which are unnecessary in the finished magnetic head, the convex portion 351 and concave portion 342 being formed in the magnetic detection element layer 39, can be removed easily.

The present invention is not limited to the above-described embodiment.

For example, as the MR element layer 33, a current in plane (CIP) type element can be also used. In this case, in the above-described embodiment, insulating gap layers formed of alumina or the like are provided in place of the upper metal gap layer 36 and lower metal gap layer 32. Moreover, in the MR element layer 33, a metal layer for feeding the sense current in parallel with the laminated plane is provided.

Moreover, although in the above-described embodiment the magnetic head part 40 has the electromagnetic coil element 34 as the magnetic recording element, a configuration without the electromagnetic coil element 34 is also possible.

Moreover, the convex portions 831, 851 and concave portions 832 and 852, which the reticle pattern 83 corresponding to the resist pattern 70a for magnetic detection element layers 39 and the reticle pattern 85 corresponding to the resist pattern 70b for conductive layer 30 in the reticle 80 have, may be single in stead of multiple.

Figure 14:
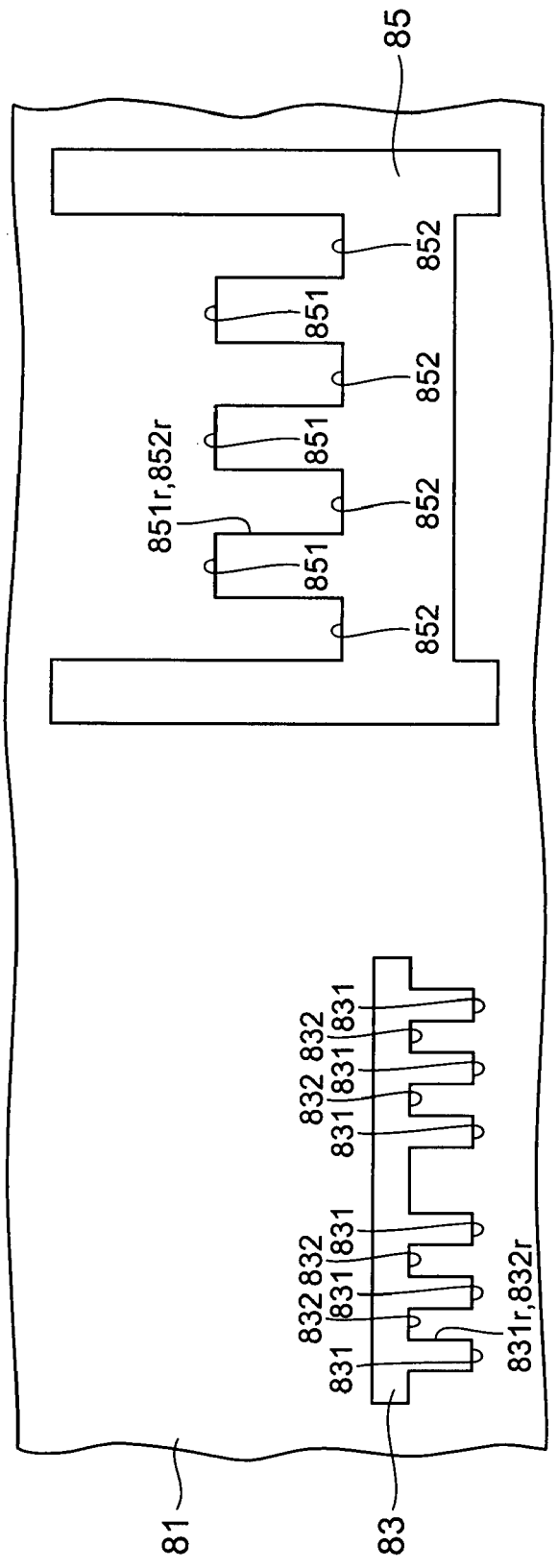
FIG. 14 is a schematic plan view showing a modification of reticle patterns 83 and 85.
Figure 15:
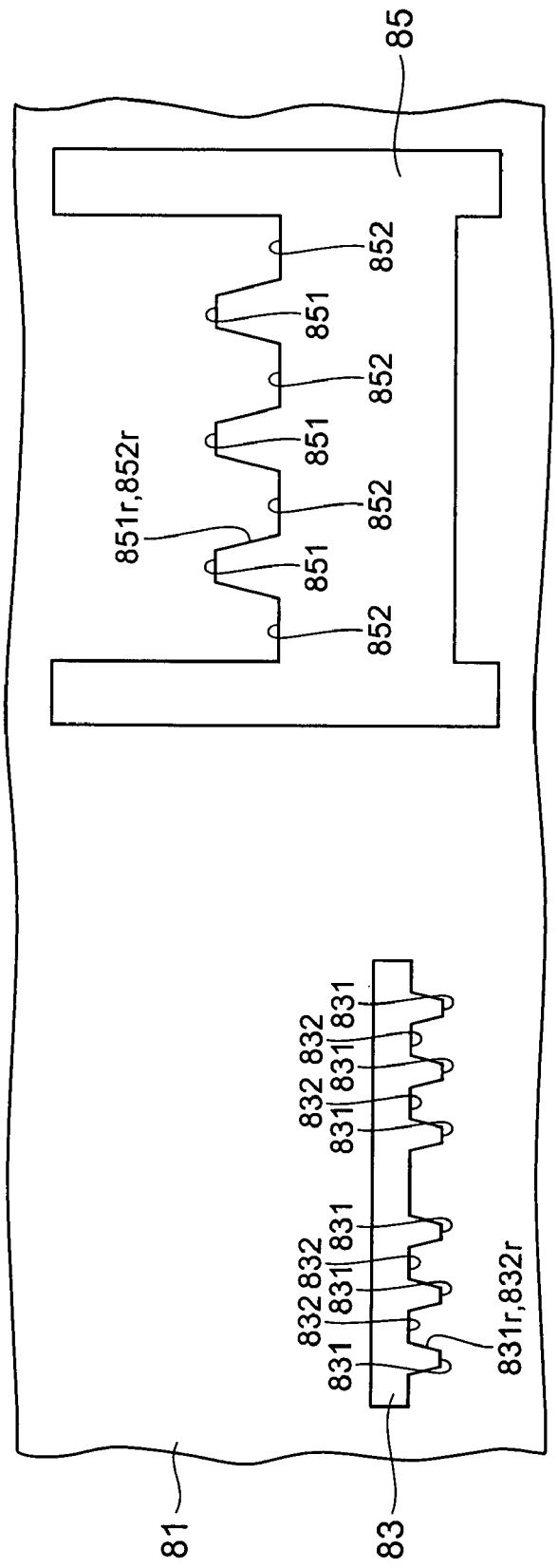
FIG. 15 is a schematic plan view showing a modification of the reticle patterns 83 and 85.

The shapes of the convex portions 831, 851 and concave portions 832 and 852, which the reticle pattern 83 corresponding to the resist pattern 70a for magnetic detection element layers 39 and the reticle pattern 85 corresponding to the resist pattern 70b for conductive layer 30 in the reticle 80 have, may be in the shape of other than a square, and for example, as shown in FIG. 14, all the shapes may be rectangular or may be trapezoidal as shown in FIG. 15.

Moreover, as shown in FIG. 16, among the convex portions 831, 851 and concave portions 832, 852, which the reticle pattern 83 and reticle pattern 85 in the reticle 80 have, the mutually adjoining convex portions 831, 851 and concave portions 832, 852 may not have the respective side edges 831r, 832r and side edges 851r, 852r in common, but the convex portion 831 and concave portion 832, and the convex portion 851 and concave portion 852 may be separated from each other, respectively.

Moreover, the convex portion 701a and concave portion 702a of the resist pattern 70a for magnetic detection element layers 39 may be formed in a portion other than the magnetic domain controlling layer 35, for example, so as to cover the MR element layer 33 (see FIG. 9(a)).

Moreover, the convex portion 701a and concave portion 702a of the resist pattern 70a for magnetic detection element layers 39 may be formed in the face (in the upper side face of FIG. 9(a)) opposite to the medium facing surface S side of the magnetic domain controlling layer 35.

Moreover, the convex portion 701b and concave portion 702b of the resist pattern 70b for conductive layer 30 may be formed in the face (in the lower side face of FIG. 9(a)) at the medium facing surface S side of the resist pattern 70b.

What is claimed is:

1. A method of making a magnetic head, comprising:
   a resist pattern forming step of forming a resist pattern for magnetic detection element layer for determining an initial height in the direction perpendicular to a medium facing surface of the magnetic detection element layer and a resist pattern for conductive layer for determining an initial height in the direction perpendicular to the medium facing surface of the conductive layer on a substrate having the magnetic detection element layer and the conductive layer spaced apart in a track width direction relative to the magnetic detection element layer by exposure using a reticle, wherein, as a reticle pattern corresponding to the resist pattern for magnetic detection element layer and a reticle pattern corresponding to the resist pattern for conductive layer in the reticle, a reticle having a convex portion that projects in the height direction and a concave portion that dents in the direction opposite to the convex portion, respectively, is used to form a convex portion and concave portion corresponding to the convex portion and concave portion of the reticle pattern in the resist pattern for magnetic detection element layer and in the resist pattern for conductive layer, respectively;
   an initial height determining step of determining an initial height of the magnetic detection element layer and an initial height perpendicular to the medium facing surface of the conductive layer by removing unnecessary portions of the magnetic detection element layer and the conductive layer with the each resist pattern as a mask, and forming a convex portion and concave portion corresponding to the convex portion and concave portion of the resist pattern in the magnetic detection element layer and in the conductive layer, respectively;

a magnetic detection element layer deviation obtaining step of obtaining a deviation in the height direction concerning a surface intersecting the height direction of the magnetic detection element layer, based on a ratio between a width in the track width direction of the convex portion of the magnetic detection element layer and a width in the track width direction of the concave portion of the magnetic detection element layer;

a conductive layer deviation obtaining step of obtaining a deviation in the height direction concerning a surface intersecting the height direction of the conductive layer, based on a ratio between a width in the track width direction of the convex portion of the conductive layer and a width in the track width direction of the concave portion of the conductive layer; and a grinding step of grinding the medium facing surface with the conductive layer as a resistance sensor so that a height of the magnetic detection element layer be a desired value, based on the deviation in the height direction of the magnetic detection element layer and the deviation in the height direction of the conductive layer.

2. The method of making a magnetic head according to claim 1, wherein the reticle pattern corresponding to the resist pattern for magnetic detection element layer and the reticle pattern corresponding to the resist pattern for conductive layer in the reticle have a plurality of the convex portions and a plurality of the concave portions, respectively.

3. The method of making a magnetic head according to claim 1, wherein among the convex portions and the concave portions which the reticle pattern corresponding to the resist pattern for magnetic detection element layer and the reticle pattern corresponding to the resist pattern for conductive layer in the reticle have, the convex portion and concave portion adjoining to each other have a common side edge, respectively.

4. The method of making a magnetic head according to claim 1, wherein the convex portion and the concave portion, which the reticle pattern corresponding to the resist pattern for magnetic detection element layer and the reticle pattern corresponding to the resist pattern for conductive layer in the reticle have, are rectangular, square, or trapezoidal.

5. The method of making a magnetic head according to claim 1, wherein the convex portion and the concave portion, which the reticle pattern corresponding to the resist pattern for magnetic detection element layer and the reticle pattern corresponding to the resist pattern for conductive layer in the reticle have, are square.

6. The method of making a magnetic head according to claim 1, wherein the magnetic detection element layer includes an MR element layer and a magnetic domain controlling layer provided at both sides in the track width direction of the MR element layer; wherein the resist pattern for magnetic detection element layer covers the MR element layer and the magnetic domain controlling layer; and wherein the convex portion and the concave portion of the resist pattern for magnetic detection element layer are formed in a portion that covers the magnetic domain controlling layer.

7. The method of making a magnetic head according to claim 6, wherein the convex portion and the concave portion of the resist pattern for magnetic detection element layer are formed in a face at the medium facing surface side of the magnetic domain controlling layer.

* * * * *